L. B. FISHER.

Straw Cutter.

No. 13,718.

Patented Oct. 30, 1855.

Witnesses
Z. H. Burdick,
Erin Thouden

Inventor
Luther B. Fisher

UNITED STATES PATENT OFFICE.

LUTHER B. FISHER, OF COLDWATER, MICHIGAN.

STRAW-CUTTER.

Specification of Letters Patent No. 13,718, dated October 30, 1855.

*To all whom it may concern:*

Be it known that I, LUTHER B. FISHER, of the town of Coldwater, county of Branch, and State of Michigan, have invented a new and useful Mode of Constructing Straw-Cutters; and I do hereby declare that the following is a full and exact description thereof, reference being had to the accompanying drawing and to the letters of reference marked thereon.

Figure 1:
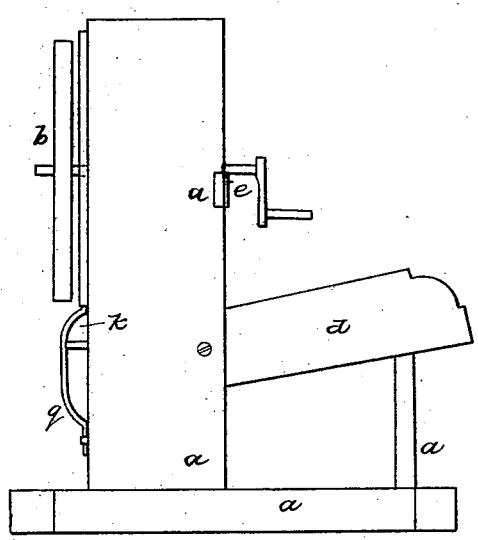
Figure 2:
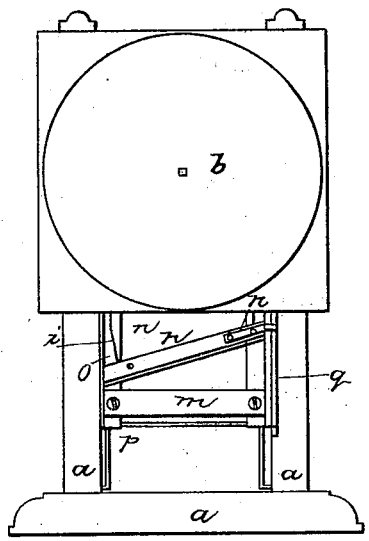
Figure 5:
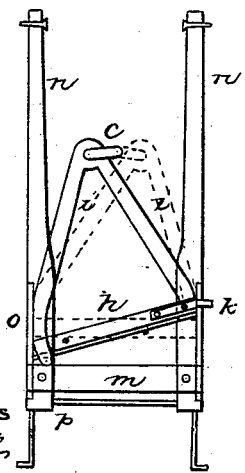
Figure 3:
Figure 4:
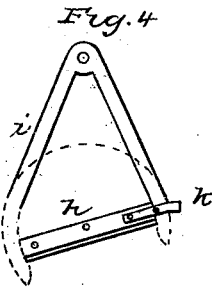
Figure 6:
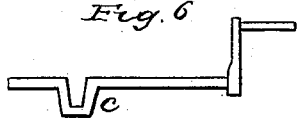

Figure 1, is a side view of my improvement in straw cutters. Fig. 2, is a front view. Fig. 3, is a side view of bottom of the straw box; Fig. 4, front view of upper knife together with gate or frame to which it is secured; Fig. 5, front view of lower knife, showing the manner in which it is attached to the frame; Fig. 6, the crank.

(a, a) represents the frame; (b), the fly wheel which may be a grind stone; (c), crank shaft and crank; (d) box to contain the straw; (f), bottom of said box is made with a joint at (f). The object of said joint is to allow the end of the bottom to yield as shown by dotted lines when the pressure of the upper knife is forced down upon the straw, thereby giving both knives an equal chance to cut, and that too on the principle of shears. Said box may be made in the usual form and hinged to the frame, and the entire end made to yield and spring back; or it may be connected to any of the moving parts of said machine as may best suit the constructor. (g) spring to raise the bottom (f) to its place on each upward motion of knife (h); (i), frame or gate. The lower ends of the sides are formed on a circle as shown by the dotted line. The center is at the dot near (h). The upper end of said frame may be said to form the pitman or connection and is attached to crank (c). (h), upper knife, the edge on the lower side; (k), a projection or ear, may be riveted or cast on the frame (i); (m), lower knife, secured to pieces (n, n) which may be wood or iron. The ends of said frame are bolted loosely to the inside and upper ends of posts (a, a). (o, o), grooves secured to pieces (n, n) for the purpose of admitting frame (i) to slide in; (p), rock shaft; (q), angular groove for ear (k) to slide in.

The nature of my improvement consists in the form of frame (i) in connection with ear (k) and knife (h) and the adjustable bottom (f) for the purpose of receiving full benefit of two knives with one gate, also the vibration of the knives sidewise for the purpose of self feeding the straw to be cut.

Operation: It will be seen that by the downward motion of frame (i) crank (c) carries the top of frame (i) past the center, consequently throwing one end of knife (h) the lowest, while the upward motion of the knife, it will be seen by dotted lines is nearly on a level. The straw is drawn forward by the side motion of the knives which is caused by the ear (k) working in angular groove (q). As the knives begin to take hold of the straw, it will be seen that angular groove (q) suddenly brings forward the knives and straw altogether. In the upward motion just as the knife is on the turn to go down again, it will be seen that by the peculiar motion of frame (i) caused by crank (c) and groove (q) that the knives are suddenly thrown back to take the straw that was drawn out in the preceding cut. Thus the operation continues. The object of rock shaft (p) is to cause both pieces (n, n) to vibrate equally as they move with the knives.

What I claim and desire to secure by Letters Patent is—

Ear (k) in combination with angular groove (q) pieces (n, n) and rock shaft (p).

LUTHER B. FISHER.

Witnesses:
F. T. EDDY,
HIRAM SHONDLER.